United States Patent
Friedlander

(10) Patent No.: US 9,248,765 B2
(45) Date of Patent: Feb. 2, 2016

(54) PORTABLE PASSENGER SEAT DIVIDER

(71) Applicant: Ken Friedlander, Dublin, OH (US)

(72) Inventor: Ken Friedlander, Dublin, OH (US)

(*) Notice: Subject to any disclaimer, the term of this patent is extended or adjusted under 35 U.S.C. 154(b) by 1 day.

(21) Appl. No.: 14/196,391

(22) Filed: Mar. 4, 2014

(65) Prior Publication Data

US 2014/0252821 A1  Sep. 11, 2014

Related U.S. Application Data

(60) Provisional application No. 61/774,024, filed on Mar. 7, 2013.

(51) Int. Cl.
| | |
|---|---|
| *A47C 15/00* | (2006.01) |
| *B60N 2/46* | (2006.01) |
| *B60N 3/00* | (2006.01) |
| *B64D 11/06* | (2006.01) |
| *A47C 7/66* | (2006.01) |
| *B60R 21/02* | (2006.01) |

(52) U.S. Cl.
CPC ............... *B60N 2/468* (2013.01); *B60N 3/002* (2013.01); *B64D 11/0644* (2014.12); *B64D 11/0646* (2014.12); *A47C 7/66* (2013.01); *B60R 21/02* (2013.01); *Y10T 29/49826* (2015.01)

(58) Field of Classification Search
CPC .................................. B60R 21/02; A47C 7/66
USPC ............. 297/232, 464, 184.1, 184.14, 248, 297/188.14, 162; 108/47, 157.11
See application file for complete search history.

(56) References Cited

U.S. PATENT DOCUMENTS

| | | | | |
|---|---|---|---|---|
| 3,893,729 | A | * | 7/1975 | Sherman et al. ............ 297/118 |
| 4,662,676 | A | * | 5/1987 | Havelock .................... 297/160 |
| 5,139,309 | A | * | 8/1992 | Kornreich ................... 297/162 |
| H1382 | H | * | 12/1994 | Goldberg et al. ....... 297/188.14 |
| 5,971,487 | A | | 10/1999 | Passehl |
| 6,092,867 | A | * | 7/2000 | Miller ..................... 297/188.14 |
| 6,260,903 | B1 | | 7/2001 | von der Heyde |
| 6,467,839 | B1 | * | 10/2002 | Kain ....................... 297/188.14 |
| 6,644,736 | B2 | | 11/2003 | Nguyen et al. |
| 7,568,759 | B2 | | 8/2009 | Schürg |
| 7,641,278 | B2 | | 1/2010 | Strasser et al. |
| 2005/0194827 | A1 | | 9/2005 | Dowty et al. |
| 2012/0068490 | A1 | | 3/2012 | Vance |

FOREIGN PATENT DOCUMENTS

EP  0773134 A3  12/1998

* cited by examiner

*Primary Examiner* — Syed A Islam
(74) *Attorney, Agent, or Firm* — Howard M. Cohn; Daniel Cohn

(57) ABSTRACT

A portable passenger seat divider and method for providing a protective separator between adjacent seats. The passenger seat divider includes a middle portion formed into a channel that is adapted to be removably mounted to an armrest disposed between the adjacent seats. The passenger seat divider also includes an upper portion extending above the armrest when the passenger seat divider is mounted to the armrest and a lower portion adapted to extend below the armrest of the seat when the passenger seat divider is mounted to the armrest.

17 Claims, 4 Drawing Sheets

PORTABLE PASSENGER SEAT DIVIDER

This non-provisional application claims the benefit of the provisional application filed with the United States Patent and Trademark Office as Application No. 61/774,024 entitled PASSENGER SEAT DIVIDER, filed Mar. 7, 2013.

TECHNICAL FIELD OF THE INVENTION

The present invention relates to a passenger seat divider and more particularly to a passenger seat divider that can be removably mounted to an armrest disposed between adjacent seats.

BACKGROUND OF THE INVENTION

Aircraft seating is typically divided into various classes, for example first class, business class, and coach class. For each class of seating, an individual passenger is allotted a preselected amount of space (both area and volume). First-class seats provide the most individual space, and also may include features to improve comfort, such as fully reclining sleeper functions. In contrast, the coach class, and sometimes the business class is provided with a relatively small amount of space, in order to provide the most efficient transportation and lowest cost.

Typically, passengers are more satisfied by a given quantity of space when that space is completely controlled by the passenger. Since the space for coach-class seating is limited, it is especially important that a passenger's personal space be protected from intrusion from other passengers. However, coach class seats are generally arranged such that passengers that are seated side-by side must share a single armrest. In this arrangement, the armrest width allotted to each passenger, and the dividing line between adjacent seats, is not clearly delineated. Often people will encroach into what is intended to be the space of the person seated next to them. This can lead to conflicts between passengers as each tries to assert control of the single armrest, as well as discomfort of the passenger that gets a smaller portion of the armrest or no armrest at all.

SUMMARY OF THE INVENTION

According to an embodiment of the present invention, there is disclosed a passenger seat divider for providing a protective separator between adjacent seats. The passenger seat divider includes a middle portion formed into a channel that is adapted to be removably mounted to an armrest disposed between the adjacent seats; an upper portion extending above the armrest when the passenger seat divider is mounted to the armrest; and a lower portion adapted to extend below the armrest of the seat when the passenger seat divider is mounted to the armrest while solely residing within the person's provided space.

Further according to an embodiment of the present invention, a passenger seat divider for providing a protective separator between adjacent airplane seats includes: a middle portion that formed into a rectangular channel that is adapted to be removably mounted to an armrest disposed between the adjacent airplane seats; an upper portion extending above the armrest when the passenger seat divider is mounted to the armrest; and a lower portion adapted to extend below the armrest of the seat when the passenger seat divider is mounted to the armrest.

Also according to an embodiment of the present invention, a method for removably mounting a passenger seat divider to an armrest disposed between two adjacent seats includes: removably mounting a middle, channel shaped portion of the passenger seat divider to the armrest; extending an upper portion of the passenger seat divider upward and outward from the armrest; extending a lower portion of the passenger seat divider downward and outward from the armrest; and inserting the lower portion between the two adjacent seats to secure the passenger seat divider to the armrest.

BRIEF DESCRIPTION OF THE DRAWINGS

The structure, operation, and advantages of the present invention will become further apparent upon consideration of the following description taken in conjunction with the accompanying figures (FIGs.). The figures are intended to be illustrative, not limiting. Certain elements in some of the figures may be omitted, or illustrated not-to-scale, for illustrative clarity. The cross-sectional views may be in the form of "slices", or "near-sighted" cross-sectional views, omitting certain background lines which would otherwise be visible in a "true" cross-sectional view, for illustrative clarity.

In the drawings accompanying the description that follows, both reference numerals and legends (labels, text descriptions) may be used to identify elements. If legends are provided, they are intended merely as an aid to the reader, and should not in any way be interpreted as limiting.

DETAILED DESCRIPTION OF THE PREFERRED EMBODIMENTS

Figure 1:
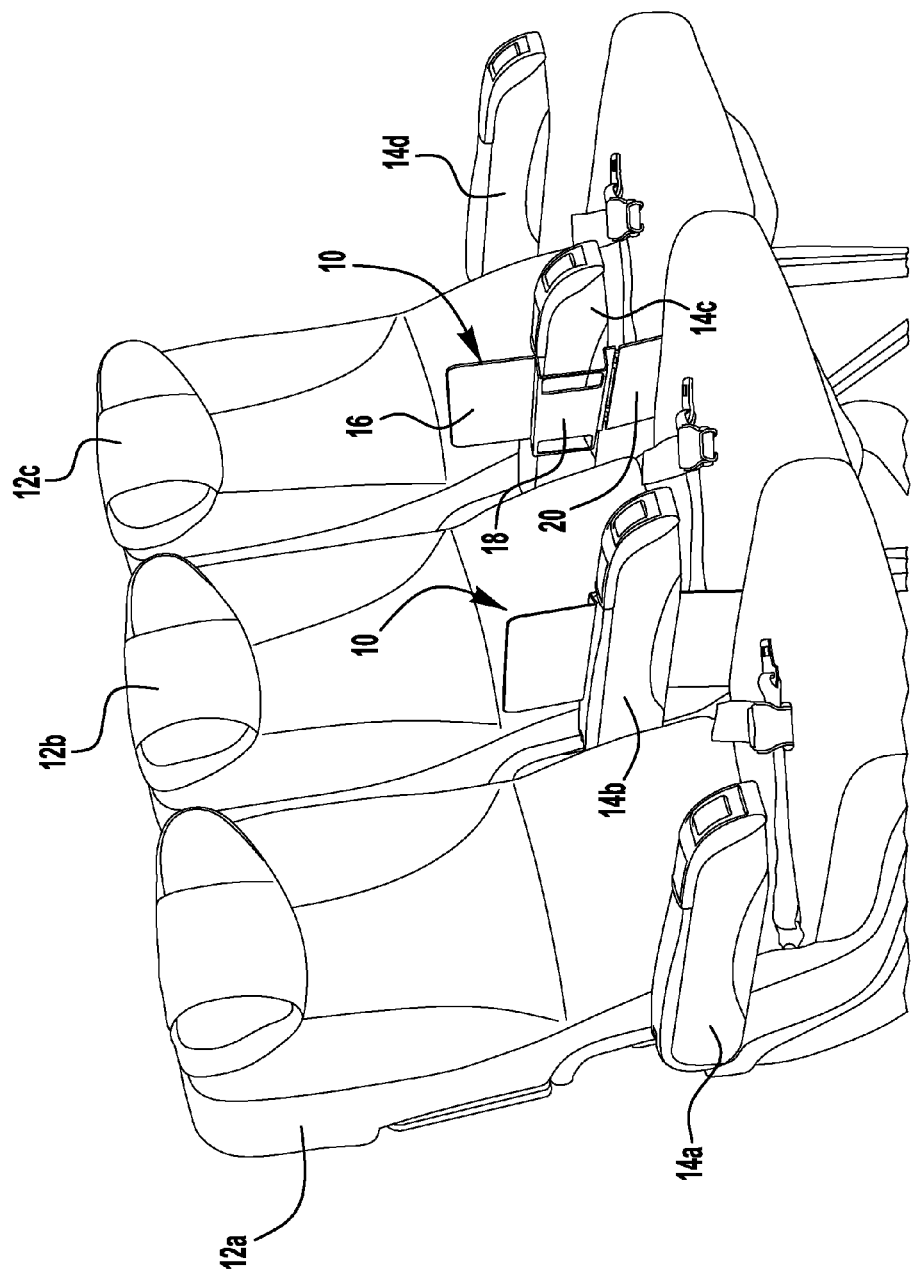
FIG. 1 is a front, three-dimensional view of the passenger seat divider in use, in accordance with the present invention.

In the description that follows, numerous details are set forth in order to provide a thorough understanding of the present invention. It will be appreciated by those skilled in the art that variations of these specific details are possible while still achieving the results of the present invention. Well-known processing steps are generally not described in detail in order to avoid unnecessarily obfuscating the description of the present invention.

In the description that follows, exemplary dimensions may be presented for an illustrative embodiment of the invention. The dimensions should not be interpreted as limiting. They are included to provide a sense of proportion. Generally speaking, it is the relationship between various elements, where they are located, their contrasting compositions, and sometimes their relative sizes that is of significance.

In the drawings accompanying the description that follows, often both reference numerals and legends (labels, text descriptions) will be used to identify elements. If legends are provided, they are intended merely as an aid to the reader, and should not in any way be interpreted as limiting.

The objective of the passenger seat divider 10 is to provide a portable protective separator that fits within the confines of a person's seat and shields a person in a passenger seat, such as on an airplane, from contacting an adjacent passenger's body and germs. Generally, airplane seats are arranged such that passengers that are seated side-by side must share a single armrest. In this arrangement, the armrest width allotted to each passenger, and the dividing line between adjacent seats, is not clearly delineated. The average airline seat is between 17 inches to 19 inches wide, and a large portion of the population is wider than this width. As a result, it is common for a person sitting in an airline seat to overlap into the open space between airline seats. This overlap causes irritation, increased body contact, pain in the sides, germs, spilled food and drinks, etc. for the person sitting adjacently to them.

FIG. 1 illustrates a front three-dimensional view of two passenger seat dividers 10 in use between airplane seats 12a, 12b, and 12c (12a-12c) which are collectively provided with four armrests 14a, 14b, 14c, and 14d (14a-14d), respectively, each shown in the lowered passenger-use position. The passenger seat divider 10 is designed to help keep two passengers, seated next to each other, from encroaching on each other's space.

The passenger seat divider 10 creates a more relaxing and enjoyable experience, by keeping each passenger's elbows, arms, and upper legs in his or her own seat area. Passenger seat divider 10 ensures that a passenger's personal space is not violated, and creates a level of comfort for a group of passengers sitting in close proximity. Passenger seat divider 10 creates a physical barrier both above and below the armrests 14b and 14c to eliminate physical contact, while dividing the armrest so both people can use it simultaneously without violating any FAA, TSA or airline restrictions or rules. For example, each passenger seat divider 10 is securely placed upon the armrests 14b and 14c and between adjacent seats, e.g. 12a and 12b or 12b and 12c, in the lowered passenger-use position, such that people sitting in seats 12a and 12b, and 12b and 12c have a barrier between them. This prevents the passengers in seats 12a and 12c, respectively, from placing his or her elbow beyond the center of the armrest 14b and 14c, respectively.

Figure 2:
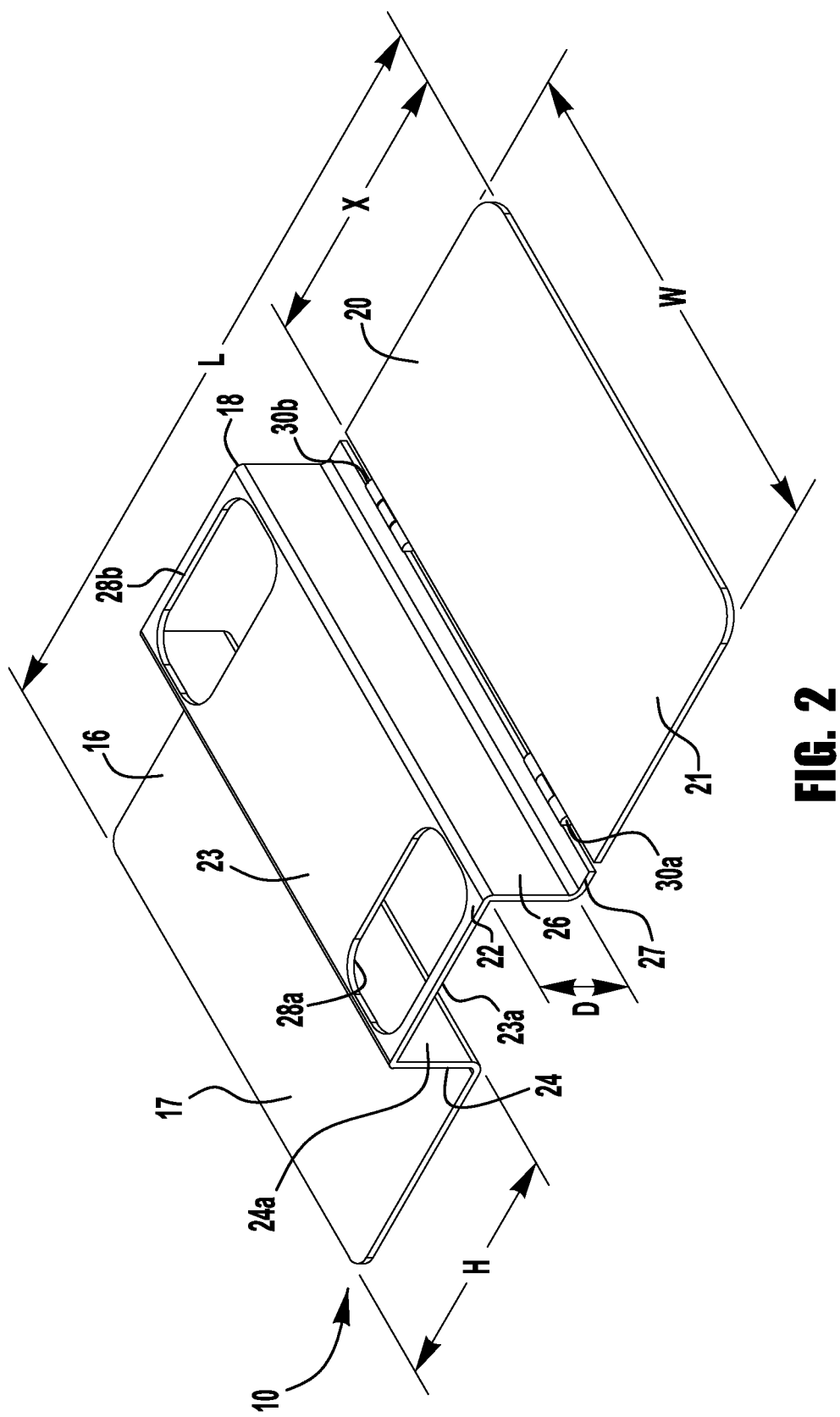
FIG. 2 is a front, three-dimensional view of the passenger seat divider, in accordance with the present invention.
Figure 3:
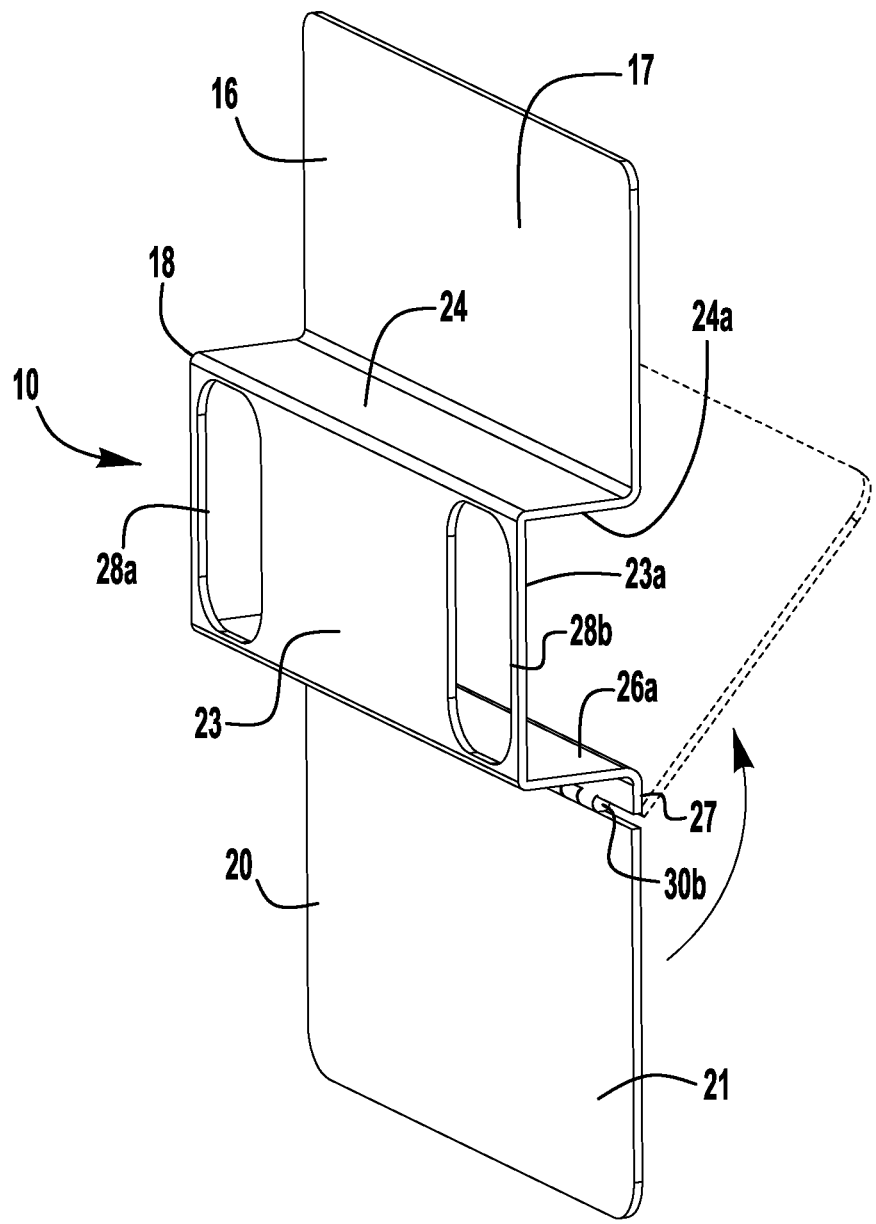
FIG. 3 is a front, three-dimensional view of the passenger seat divider with a portion including movement of a portion about a hinge, in accordance with the present invention.

As illustrated in FIGS. 2 and 3, the passenger seat divider 10 consists of an upper portion 16, a middle portion 18, and a lower portion 20. While the passenger seat divider 10 is preferably constructed so that the lower portion 20 is pivotally mounted to the middle portion 18, it is within the terms of the preferred embodiment that the seat divider 10 is formed of a single, unified construction. In either case, the divider 10 is designed to fit between the seats of most airplanes, or any other passenger seats with an armrest therebetween.

The passenger seat divider 10 may have any suitable dimensions, with a length L between 7 and 25 inches, and a width W between 6 and 12 inches, and with the preferred embodiment having a length L of about between about 12 and 14 inches and a width W of about 7 and 9 inches. Passenger seat divider 10 may be constructed of any type of suitable material, preferably a lightweight, plastic polymer with or without a soft touch paint. Although passenger seat divider 10 is shown between airplane seats 12a, 12b, and 12c, it may be adapted for use between any passenger seats, such as an airplane, bus, train, or any other suitable location.

Figure 4:
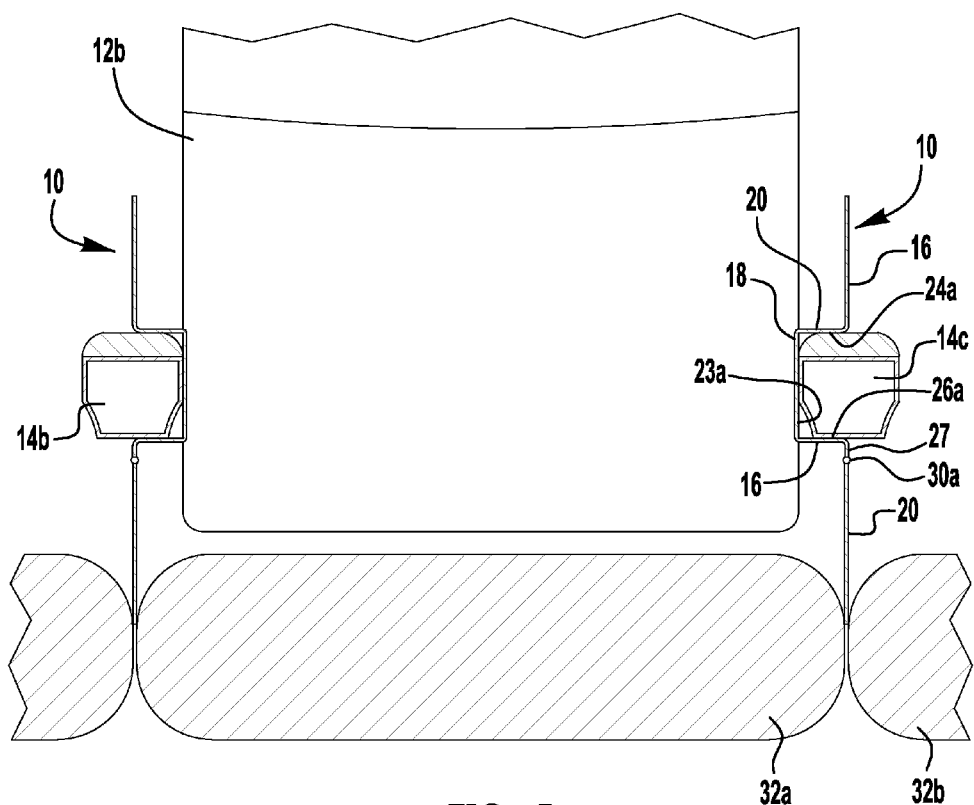
FIG. 4 is a cross-sectional view of the passenger seat divider in use, in accordance with the present invention.

The upper portion 16 of the passenger seat divider 10 is a protective barrier adapted to extend above the armrest 14c, and may be of any suitable dimensions, with a height H between about 4 and 16 inches, and the width W between about 6 and 12 inches, with the preferred embodiment being between 4 and 6 inches in height H and preferably between about 7 and 9 inches in width W. As seen in FIGS. 1 and 4, upper portion 16 extends above the armrests 14b and 14c when the passenger seat dividers 10 are removably mounted to armrests 14b and/or 14c. Although upper portion 16 is illustrated as being generally rectangular in shape, it is within the terms of the preferred embodiment that the seat divider 10 be constructed with any desired shape such as square or semicircular.

Referring to FIGS. 2 and 3, the middle portion 18 of the passenger seat divider 10 forms a generally three sided, rectangular shaped channel that is adapted to be secured to an armrest. The middle portion 18 has an upper wall 22 whose outer surface 23 is disposed substantially parallel to the upper surface 17 of the upper portion 16 and substantially parallel to the upper surface 21 of the lower portion 20. In addition the outer surface 23 is disposed a distance D of about between 0.75 and 2 inches, and preferably between about 2 and 4 inches above upper surfaces 17 and 21 of the upper portion 16 and the lower portion 20, respectively.

The channel 18 having a rectangular cross-section, has a first wall 24 that interconnects the upper portion 16 with the upper wall 22 and a second wall 26 that interconnects the lower portion 20 with the with the upper wall 22. Further, rectangular shaped channel 18 has a shoulder 27 which extends outward and away from the channel from the opposite end of the wall that connects along a first edge with the upper wall 22 and has The one or more hinges 30a, 30b mounted to the second edge that extends outward from the second wall 26 are also mounted to lower portion 20. However, it is within the terms of the embodiment that a shoulder similar to shoulder 27 extends beyond the first wall 24.

As shown in FIG. 4, the dimensions of middle portion 18 are such that the passenger seat divider 10 can be removably secured to armrests 14b and 14c so that the rectangular shaped channel 18 mounts onto the armrest so that an inner surface 23a of the upper wall 22 rests against the vertical sides of the armrest, the inner surface 24a of first wall 24 rests against the upper side of the armrest, and the inner surface 26a of the second wall 26 rests against the bottom side of the armrest. Note that the passenger seat divider 10 is removably mounted to the armrest and actually is held onto the arm by the inner surface 24a of first wall 24 resting upon the upper side of the armrest.

Additionally, there may be one or more cutouts 28a and 28b through the upper wall 22. Cutouts 28a and 28b allow the user access to any buttons or controls (not shown) within the armrests 14b and 14c, such as for example volume controls and seat positioning controls.

Lower portion 20 of the passenger seat divider 10 is a foldable protective barrier adapted to extend below the armrest and between adjacent seats so as stabilize the seat divider and keep it in place when it is mounted onto an armrest. The lower portion 20 may be of any suitable dimensions, with a length X of about between 5 and 9 inches, and preferably between about 6 and 8 inches. Lower portion 20 is the portion of passenger seat divider 10 that extends below the armrest and between adjacent seats to further shield the passengers in adjacent seats from unwanted contact. Further, as described below with reference to FIG. 4, lower portion 20 extends between the seats, such as airplane seats 12b and 12c, and is adapted to secure the passenger seat divider 10 in place. Although lower portion 20 is illustrated as being rectangular in shape, any desired shape may be utilized.

It is within the terms of the embodiment that the passenger seat divider 10 may be foldable for easy transport. This may be accomplished in a variety of ways. For example, as illustrated in FIGS. 2 and 3, there may be a pair of hinges 30a and 30b that connects the lower portion 20 to the shoulder 27 of the middle portion 18. This allows the lower portion 20 to fold against the upper portion 16, to reduce the size of passenger seat divider 10. Although the lower portion 20 is shown to have hinges 30a and 30b attached thereto, it is within the terms of the embodiment that upper portion 14 has hinges 30a and 30b attached thereto, and is connected to shoulder 27 of the middle portion 18, or that there be hinges attached to both the upper portion and the lower portion.

FIG. 4 illustrates a cross-sectional view of the two passenger seat dividers 10 in use. As illustrated, passenger seat divider 10 is placed about the armrest 14c. The rectangular shaped channel 18 fits around the armrest 14c and the upper portion 16 extends upward and outward from the armrest and the lower portion 20 extends downward and outward from the armrest. Note that the upper and lower portions extend outward in opposite directions from the armrest. The lower portion 20 extends between the seat cushions 32a and 32b of the adjoining seats 12b and 12c.

Although the invention has been shown and described with respect to a certain preferred embodiment or embodiments, certain equivalent alterations and modifications will occur to others skilled in the art upon the reading and understanding of this specification and the annexed drawings. In particular regard to the various functions performed by the above described components (assemblies, devices, etc.) the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more features of the other embodiments as may be desired and advantageous for any given or particular application.

The invention claimed is:

1. A portable passenger seat divider for providing a protective separator between adjacent seats, comprising:
   a middle portion formed into a channel that is adapted to be removably mounted to an armrest disposed between the adjacent seats;
   wherein the middle portion is a rectangular shaped channel that is adapted to be secured to the armrest;
   an upper portion extending above the armrest when the passenger seat divider is mounted to the armrest;
   a lower portion adapted to extend below the armrest of the seat when the passenger seat divider is mounted to the armrest; and
   wherein the middle portion comprises:
   an upper wall that is substantially parallel to the upper portion and the lower portion the passenger seat divider and spaced above the upper portion and the lower portion;
   a first wall that interconnects with the upper wall and the upper portion; and
   a second wall that interconnects with the upper wall and the lower portion.

2. The portable passenger seat divider of claim 1 wherein the adjacent seats are airplane seats and the passenger seat divider is secured on the armrest therebetween.

3. The portable passenger seat divider of claim 1 wherein the upper portion, the middle portion, and the lower portion are constructed of a single, unified construction.

4. The portable passenger seat divider of claim 1 wherein the passenger seat divider is constructed of lightweight, plastic polymer with or without a soft touch paint.

5. The portable passenger seat divider of claim 1 wherein the middle portion further comprises:
   a shoulder extending away from the channel from the opposite end of the first wall that connects along a first edge with the upper wall; and
   at least one hinge mounted to a second edge extending outward from the second wall and to the lower portion.

6. The portable passenger seat divider of claim 1 wherein the middle portion fits around the armrest and the upper portion extends upward from the armrest and the lower portion extends downward from the armrest.

7. The portable passenger seat divider of claim 6 wherein the rectangular shaped channel is adapted to mount onto the armrest so that an inner surface of the upper wall rests against a vertical side of the armrest, an inner surface of the first wall rests against an upper side of the armrest, and an inner surface of the second wall rests against a bottom side of the armrest.

8. The portable passenger seat divider of claim 1 wherein the upper wall of the middle portion has one or more cutouts therein.

9. The portable passenger seat divider of claim 6 wherein the lower portion extends downward between the adjacent seats, and is adapted to secure the passenger seat divider in place.

10. The portable passenger seat divider of claim 9 wherein a pair of hinges connect the lower portion to the shoulder of the middle portion to allow the lower portion to fold against the upper portion, to reduce the size of passenger seat divider.

11. A portable passenger seat divider for providing a protective separator between adjacent airplane seats, comprising:
    a middle portion that formed into a rectangular channel that is adapted to be removably mounted to an armrest disposed between the adjacent airplane seats;
    an upper portion extending above the armrest when the passenger seat divider is mounted to the armrest;
    a lower portion adapted to extend below the armrest of the seat when the passenger seat divider is mounted to the armrest: and
    wherein the middle portion comprises:
    an upper wall that is substantially parallel to the upper portion and the lower portion the passenger seat divider and spaced above the upper portion and the lower portion;
    a first wall that interconnects with the upper wall and the upper portion; and
    a second wall that interconnects with the upper wall and the lower portion.

12. The portable passenger seat divider of claim 11 wherein the middle portion further comprises:
    a shoulder extending away from the channel from the opposite end of the first wall that connects along a first edge with the upper wall; and
    at least one hinge mounted to a second edge extending outward from the second wall and to the lower portion.

13. The portable passenger seat divider of claim 12 wherein the rectangular shaped channel is adapted to mount onto the armrest so that an inner surface of the upper wall rests against a vertical side of the armrest, the inner surface of the first wall rests against an upper side of the armrest, and an inner surface of the second wall rests against a bottom side of the armrest.

14. A method for removably mounting a portable passenger seat divider to an armrest disposed between two adjacent seats, comprising;
    removably mounting a middle, channel shaped portion of the passenger seat divider to the armrest;
    extending an upper portion of the passenger seat divider upward and outward from the armrest;
    extending a lower portion of the passenger seat divider downward and outward from the armrest; and
    inserting the lower portion between the two adjacent seats to secure the passenger seat divider to the armrest.

15. The method of claim 14 including:
disposing the passenger seat divider between two adjacent airplane seats.

16. The method of claim 14 including:
folding the lower portion of the passenger seat divider against the upper portion of the passenger seat divider to reduce the size of passenger seat divider.

17. The method of claim 16 including:
unfolding the lower portion of the passenger seat divider from against the upper portion of the passenger seat divider;
removably mounting the middle, channel shaped portion of the passenger seat divider to the armrest;
extending an upper portion of the passenger seat divider upward and outward from the armrest;
extending a lower portion of the passenger seat divider downward and outward from the armrest; and
inserting the lower portion between the two adjacent seats to secure the passenger seat divider to the armrest.

* * * * *